UNITED STATES PATENT OFFICE.

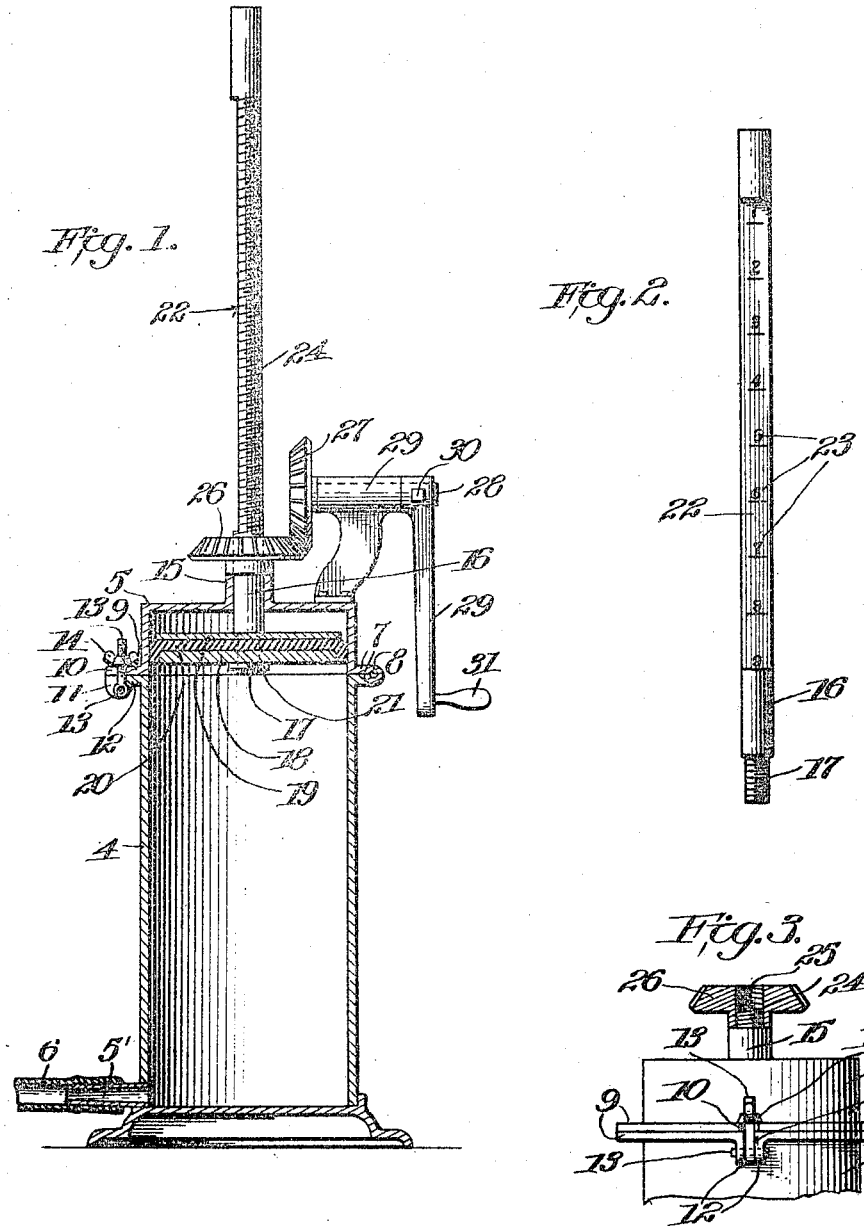

CHARLES D. FRANCE, OF HOAGLAND, INDIANA.

GREASE-GUN.

1,288,554.  Specification of Letters Patent.  Patented Dec. 24, 1918.

Application filed July 6, 1916. Serial No. 107,827.

*To all whom it may concern:*

Be it known that I, CHARLES D. FRANCE, a citizen of the United States, residing at Hoagland, in the county of Allen and State of Indiana, have invented certain new and useful Improvements in Grease-Guns, of which the following is a specification.

My invention relates to an improved grease gun.

Although the invention is capable of use as a grease gun broadly, yet it is especially designed to be carried on a portable truck as around a garage and be used for the purpose of forcing grease or hard oil into differential, transmission or other gears without waste, in the shortest practical time, and without danger of unduly soiling the hands and clothing of the operator.

Particularly the invention aims to provide a novel and improved construction adapted to supplant the present type of grease gun used in the connection stated and operating on the suction principle since in using such devices, the operator cannot at all times tell the quantity of lubricant within the gun cylinder, cannot operate the device in a comparatively short period of time, and cannot operate it without waste and without unduly soiling the hands of the operator or his clothing, Further I aim to provide an article of this type having a means, particularly that specifically hereinafter set forth, whereby the contents of the cylinder may be ascertained readily and a construction having the plunger means carried by a cylinder cover movable relatively to the remainder of the cylinder and capable of being fastened in rigid relation therewith.

With the foregoing, and additional objects such as will hereinafter appear, in view, the invention has been embodied in one preferred form as hereinafter described and illustrated in accompanying drawings;—

Figure 1 is a view partly in side elevation and partly in vertical section showing my improved grease gun;

Fig. 2 is a side elevation of the plunger screw, and

Fig. 3 is a fragmentary view showing the upper portion of the cylinder in elevation at right angles to Fig. 1 and a portion of the gear wheel to operate the plunger screw, in section.

Referring specifically to the drawing, a cylinder is provided which forms a container for hard oil, grease or other lubricant which is composed of a main section 4 and a cover section 5. This cylinder may be supported stationarily but is preferably carried on a portable truck, as around a garage or automobile service station. Connected to the main portion 4 is an outlet nipple 5' to which may removably connect a flexible hose or tube 6 adapted to convey the lubricant to the desired mechanism or parts. The cover section 5 and section 4 are provided with lugs 7 pivotally joined by a pin as at 8 whereby the cover may be swung vertically. Flanges 9 are provided at the junction of the cylinder sections 4 and 5 to reinforce the same and form a better closure therebetween and one of these flanges is provided with a space or notch 10 while the other is provided with a space or notch 11 defined by depending flanges 12 formed integral with the flange 9 of section 4. A set screw 13 is adapted to swing in the spaces 10 and 11, being pivoted to the lugs 12 as by means of a pin 13. A thumb nut 14 may ride on the threads of the screw 13 and be tightly clamped against the upper surface of flange 9 of cover 5 and serve to rigidly connect the cylinder parts 4 and 5 together. In order to raise the cover 5, the nut 14 is loosened and set screw 13 is swung downwardly so as to disengage the notch 10 whereupon said section 5 may be swung vertically on the pivot 8.

Rising centrally from the top of section 5 is a bearing 15 in which a plunger rod 16 moves vertically and which plunger rod has a screw threaded shank 17 on which is removably fastened plates 18 and 19 preferably of less diameter than the cylinder and disposing between them a washer 20, for instance, one of rubber, leather or the equivalent and which is of greater diameter than the cylinder so as to overlap the peripheral edge of plate 18 and effectively wipe the inner wall of the cylinder as shown in Fig. 1. The plates 18 and 19 and washer 20 are secured in place by means of a nut 21.

The rod 16 is provided with an oblate or flat surface at 22 upon which certain designations may be delineated as at 23 to serve as a gage to indicate the quantity of lubricant within the cylinder.

Said rod 16 is preferably screw threaded as at 24 throughout the major portion of its length and which screw threads are adapted to mesh with and coöperate with the screw threads 25 provided in the central bore of a bevel gear wheel 26 which rests upon the bearing 15 as shown in Figs. 1 and 3. It will be realized that through the turning of gear wheel 26 the plunger and its rod will move vertically within the cylinder and expel the lubricant therefrom through the nipple 3 and hose 6 to the desired mechanism or parts.

Any suitable means may be provided to operate the rod 16. For instance a bevel gear wheel 27 may mesh with the gear wheel 26, having a shaft 28 supported in a bearing 29 riding from and secured to the cover 5. Also the shaft 28 may have a handle 29 rigidly secured thereto by a set screw 30 and which is provided with a grip at 31.

It will be realized that in use, as handle 29 is turned, gear wheels 26 and 27 will cause the shaft 28 to revolve and move vertically as well within the cylinder 4—5 so as to expel the lubricant therefrom. At the same time, the indications 23 may be observed at the plane of the top surface of gear wheel 26 in order to ascertain the contents of the cylinder 4—5. When filling the cylinder, the nut 14 is first adjusted so that the top 5 may swing on the pivot 8 in order to expose the top of the part 4 thereof.

While I have stated a specific use for the grease gun, and described the construction in detail, yet it is to be understood, that I do not limit myself to any particular use nor to any particular construction since the details may be varied within the spirit and scope of appended claim.

I claim:

In a grease gun, a cylinder, a closure member hingedly secured to said cylinder at the upper end thereof, means for normally securing said closure member in closed position, a beveled gear rotatably supported by the closure member above the central portion thereof, a plunger rod threaded through the said gear and slidable through the top of the closure member, a beveled gear rotatably supported by said closure member and meshing with the beveled gear for receiving the plunger rod, means carried by the closure member for rotating the second mentioned beveled gear, and a piston secured on the lower end of the plunger rod and operative in said cylinder, said closure member being provided with a cylindrical recess coinciding with the bore of the cylinder when the closure member is in operative position, said recess being of greater depth than the thickness of the piston so as to permit said piston to be raised to such a height as to be positioned entirely within the closure member and render it possible to swing the closure member into open position about its axis of movement together with the piston and operating means therefor.

In testimony whereof I affix my signature in presence of two witnesses.

CHARLES D. FRANCE.

Witnesses:
P. L. HARTZELL,
E. SMITLEY.